United States Patent [19]

Marti et al.

[11] 4,303,941

[45] Dec. 1, 1981

[54] VIDEOTEX SYSTEM

[75] Inventors: Bernard Marti, Noyal sur Vilaine; Alain Poignet, Rennes, both of France; Claude Fournier, 22, Allée Henri Bergson, 35100 Rennes; Christian Roche, 13, rue Duguay-Trouin, 35530 Noyal sur Vilaine, both of France

[73] Assignees: Establissement Public de Diffusion dit "Telediffusion de France", Montrouge; Claude Fournier, Rennes; Christian Roche, Noyal sur Vilaine, all of France

[21] Appl. No.: 147,136

[22] Filed: May 6, 1980

[30] Foreign Application Priority Data

May 16, 1979 [FR] France ................................ 79 12472

[51] Int. Cl.³ .............................................. H04N 7/08
[52] U.S. Cl. ................................................... 358/147
[58] Field of Search ................................ 358/147, 142

[56] References Cited

U.S. PATENT DOCUMENTS 4,099,258  7/1978  Parsons ......................... 358/147 X
4,205,343  5/1980  Barrett .............................. 358/147

Primary Examiner—Richard Murray

[57] ABSTRACT

Videotex system provided with protection means against transmission errors.

It can be used in the transmission and display of data on television receivers for entertainment, information or instructional purposes.

12 Claims, 11 Drawing Figures ized into pages and magazines into television
VIDEOTEX SYSTEM

BACKGROUND OF THE INVENTION

The present invention relates to a videotex system provided with means for protecting it against transmission errors. It can be used in the transmission and display of data on television receivers for random entertainment, information or instructional purposes.

The invention is more particularly applicable to the ANTIOPE system (digital acquisition and television transmission of pictures organised in written page form) which is a transmitted videotex system (i.e. unidirectional) making it possible to insert alphanumeric data organised into pages and magazines into television channels. In such a system, the transmission of data takes place by means and a procedure called DIDON (digital data transmission). This procedure is compatible with the transmission of the television signal.

Numerous articles or patent applications already describe this system. A detailed description is provided more particularly in the following documents:

The article by Y. GUINET entitled "Comparative study of teletext systems in radio transmission. Some advantages of the transmission of data in packets applied to the teletext" published in the Journal U.E.R. cahier Technique, No. 165, October 1977, pp. 242 to 253.

the article by B. MARTI and M. MAUDUIT entitled "ANTIOPE, teletext service" published in the Journal "Radiodiffusion Television", Vol. 9, No. 40, November/December 1975, 5/5, pp. 18-23.

the specification of the ANTIOPE teletext system published by the Centre Commun d/Etudes de Télévision et Telecommunications (CCETT).

French Patent Application No. 75 18319 filed on June 6th 1975 and entitled "Data transmission system".

French Patent Application No. 76 292, filed on Sept. 6th 1976 and entitled "Digital transmission system and the display of the text on a television screen".

French Patent Application No. 76 29034 filed on Sept. 22nd 1976 and entitled "Improvements to systems for the digital transmission and display of texts on a television screen".

Application for French Certificate of Addition No. 77 17625, filed on June 3rd 1977 and entitled "data transmission system".

The ANTIOPE system will not be described in detail here because it is widely known. However, in order to facilitate the understanding of the invention, its basic principles will be described. For details of its design or construction, reference can be made to the aforementioned documents, which themselves refer to other documents and all these documents are considered as being incorporated into the present description.

FIG. 1 diagrammatically shows the essential elements of an ANTIOPE videotex system. Such a system comprises a transmission station 2 and receiver stations 4, 4', etc. The transmission station comprises:

Means 6 for composing or setting a magazine formed by pages organised into rows of characters. This means is supplied by a data bank which is, for example, a meteorological service, the Stock Exchange, an information agency, etc.

A circuit 8 for the processing and storage of the magazine in the form of digital signals grouped into octets (8 bits) divided up into data octets and control octets. A junction 10 connected to circuit 8.

A multiplexer 12 for the formation of groups of octets and the insertion of data into the lines of a television signal, said means realising the DIDON procedure referred to hereinbefore.

A modulation member 14.

Finally, an antenna 16.

Each receiver station or terminal comprises:

A circuit 20 for the reception and demodulation of a television signal.

A digital signal processing channel 22.

A picture video signal processing channel 28.

A visual display member 30.

In the ANTIOPE system, the octets carrying the data are conventionally notated in the following manner:

$$\underbrace{b_8 \quad b_7 \quad b_6 \quad b_5}_{j} \quad \underbrace{b_4 \quad b_3 \quad b_2 \quad b_1}_{k}$$

Bit $b_8$ is an oddness element, or in other words an element such that the total number of "1" appearing in the octet is odd. According to this notation, the octet $(j/k) = (4, 7)$ corresponds to octet 11000111.

The octets are subdivided into control octets and data octets. The control octets more particularly indicate the headings and ends of pages, the headings and ends of rows as well as the visual display attributes. The data octets, inserted between the control octets, correspond to the characters contained in the rows. All the control or data octets incorporate the oddness bit $b_8$.

As an example, an information page available to the user is in the following form:

(1) It firstly contains a page heading formed by control codes:

(ETX) FF RS $NP_1$ $NP_2$ $NP_3$: in which ETX is a code which terminates the preceding page, FF (0, 12) is a code indicating a new page, RS (1, 14) is a page flag, $NP_1$, $NP_2$, $NP_3$ are codes indicating a page number from 001 to 999.

(2) The page heading is followed by a "zero" row:

US OO $C_1$ $C_2$ $C_3$ . . . RC LF, in which US (1, 15) is a row flag, OO indicates the zero row, $C_1$, $C_2$, $C_3$ are complementary codes and RC (0, 13) LF (0, 10) terminate the row.

The zero row can also contain a department name, a date, a time and optionally tax details. This zero row does not carry information constituting the service. It forms part of the procedure.

(3) The zero row is followed by information rows firstly incorporating a row heading formed by the codes US, $NR_1$, $NR_2$ in which US is the row flag, $NR_1$, $NR_2$ constitute the row number from 01 to 24, followed by the data octets $d_1$, $d_2$ . . . $d_n$, which are inserted between the row heading and namely either an end of row RC, LF or an end of page ETX. These octets $d_1$, $d_2$ . . . $d_n$ represent the information constituting the transmitted service.

With regard to changes of the visual display attributes, they are transmitted by sequences preceded by the escape code ESC (1, 11). These attributes are the colour, the background colour, the size (double height, double width), blinking, the form of the symbols (choice of alphanumeric or semigraphical symbols), the incrustation and the masking.

BRIEF SUMMARY OF THE INVENTION

The problem to be solved by the present invention will now be described. It is essentially a problem of errors committed during the translation of information between the transmission station and the various reception stations and the reduction of faults caused by these errors.

A certain error rate and a certain loss rate is introduced by any digital transmission. However, whereas equipment used with digital cable networks are designed so as to take account of the risks of errors, this is not the case when the support is a television network mainly designed for transmitting information of an analog type. This situation is aggravated by the fact that it is impossible to interrupt the message and request its repetition.

Faults due to transmission errors have been evaluated. It has been shown that for 95% of users, the error rate is equal to or below $10^{-3}$ and the loss rate equal to or below $10^{-4}$, the errors being independent and the losses relating to one or more octets.

On designating by p the probability of error in transmission on a bit the loss rate is substantially 100 $p^2$, so that one octet is lost for 80 incorrect octets when $p=10^{-3}$. Thus, up to this value, the probability of loss is negligible compared with that of error. For an average page of about 800 octets, there are 7 errors per page for $p=10^{-3}$ if the terminal makes no correction, whilst one error per page—screen would appear to be the tolerable maximum. Thus, an error rate of $10^{-4}$ constitutes a limit which must not be exceeded for a correct operation of the system.

The invention relates to a means making it possible to operate the ANTIOPE system beyond this limit and up to approximately $10^{-3}$ for the error rate.

In order to define these questions, it is necessary to analyse the different faults which can be created by transmission errors on a display screen.

The "elementary" faults are constituted by visual differences between the displayed page and the transmitted page. They can be added to one another (at least up to a certain number, because the ANTIOPE system stops operating if the faults are too numerous). In order of decreasing sizes of the affected zones, these faults are:

1—page loss
2—page interference
3—incomplete page
4—row interference
5—row loose framing
6—incorrect visual display attribute (colour, size, alphabet, etc)
7—error symbol display
8—erroneous symbol display.

Faults 1 to 5 constitute a first class of fault, called paging faults. They are the most serious because they signficantly effect the quality of the videotex service. The other faults define a minor class and they have a less serious influence on the picture quality and can vary considerably from one service to another. For example, the display of error symbols is preferable to the display of erroneous symbols in a coded application (e.g. timetables, stock exchanges) whilst in general information magazines a few erroneous symbols can pass unnoticed, whereas error symbols are considered to be an embarrassment.

Paging faults make the information incoherent and this is important in all applications. For this reason, the invention attaches a particular importance to it.

For this purpose, the invention provides for the introduction of a redundancy into the signals transmitted and the use of this redundancy on reception to reduce the probability of faults. It is known that a redundancy is already provided in prior art systems, because the transmitted octets are protected by a Hamming code (of type 8, 4) and contain an oddness bit ($b_8$). However, this protection is inadequate for control octets, if it is desired to effectively reduce paging faults.

In order to increase this protection, the invention provides for the use of a redundant sequence of control codes, at least for the main controls. Thus, supplementary codes are associated with conventional codes to form redundant sequences, said codes having no particular significance for receivers not equipped with redundancy exploitation means, which ensures the compatibility of the system protected according to the invention with prior art unprotected receivers.

It should be noted that this error correction problem is of particular interest in the ANTIOPE videotex system and does not occur in the same way as other systems such as a teletext system in the United Kingdom. In the latter, the paging information is defined relative to the analog signal. The start of the row is in fact deduced from the start of the digital data carrying line and, as from the start of the row, each octet is given a physical position on the screen. Attribute change codes are visually displayed as spaces.

However, in the ANTIOPE videotex system, the latter is asynchronous and the format variable. Thus, the position of a code in the data line is not related to the position which would be occupied by the corresponding character in a row on the screen. In addition, the attribute change codes are exploited without occupying useless spaces on the screen.

Thus, the British teletext system has a good intrinsic resistance at the paging level. Thus, even incorrect characters are written in the correct order within a row, and interference between the rows is rare. This is obviously not the case in the ANTIOPE videotex system.

However, the latter system has the advantage of its variable format. Therefore, it lends itself to the introduction of control signals and it is always possible to introduce redundancy in the form of supplementary octets. Of even greater importance is the fact that this redundancy can be adapted to the specific requirements of a particular service or department. Thus, different redundant languages of different levels can be defined.

More specifically, the present invention relates to a videotex system of the type described with reference to FIG. 1 and wherein:

(A) In the transmission station 2: circuit 8 comprises means for forming control signals constituted for each control by a redundant sequence of control codes, each sequence being formed by at least two consecutive codes, whereof at least one is the conventional code corresponding to the control in question and the others have no significance able to interfer with conventional receivers, (B) in certain receiver stations: in the digital signal processing channel 22 an identification circuit is provided which utilizes the redundancy of the control sequences:

(a) for recognising in these said sequences a particular code despite any minor errors in said sequence and to restore a corrected control code corresponding to the conventional code which is then taken into account by the receiver, (b) and to recognise and indicate that certain control code sequences are seriously incorrect and cannot be taken into account, (C) in the receiver stations which are not provided with an identification circuit the digital control signals are processed in a conventional manner.

Thus, the exploitation of the redundancy level with the receivers leads to two functions: one is an error correction function and the other a function of indicating errors when they cannot be corrected. To this end, the identification circuit of the receivers is able:

to correct control sequences of two erroneous codes comprising an octet and a single invalid octet in the sense of the parity (octet X), to correct the control sequences of three erroneous codes comprising up to two octets X without an octet Z, Z being a valid octet in the sense of the parity, but not belonging to the functioning sequence, to indicate erroneous sequences comprising a number of octets X and octets Z which exceeds a given value, dependent on the sequence length or which comprises one octet X and one octet Z.

The introduction of the redundancy can take place at several levels and in several ways depending on the degree of protection which it is desired to obtain and the controls which it is desired to protect.

According to a first variant, the dependency is introduced level with the start of the page in the following manner:

(A) in the transmitter the sequence formation circuit is able to constitute for each page start a sequence of two codes formed by the conventional RS code preceded by a code having no significance for receivers not equipped with the identification circuit, for example the SOH code, the sequence then being written (SOH; RS), (B) the identification circuit is able:
to recognise sequences such as:

(SOH; RS), (X; RS), (SOH; X)

and to restore in the three cases the conventional page slag code RS,
to recognise that there is an error in sequences such as:

(X; X), (Z; RS), (SOH; Z).

With regard to the end of page control, conventionally referenced by the ETX code it is possible to provide that:

(A) in the transmitter, the sequence formation circuit is able to constitute for each end of page a sequence formed by the ETX code, followed by a code having no significance for receivers not provided with the identification circuit, for example the EOT code, (B) the identification circuit is able:
to recognise sequences such as:

(ETX; EOT), (ETX; X), (X; EOT)

and to restore in the three cases the conventional end of page code ETZ,
to recognise that there is an error in sequences such as:

(X; XO, (Z; EOT), ETZ; Z).

The redundancy can also be introduced and exploited level with the rows.

It has been seen that the synchronization of these rows is referenced either by the conventional carrier return code RC followed by the line jump code LF, or by the row flag code US followed by the row number. According to the invention, it is provided that:

(A) in the transmitter, the sequence formation circuit is able to constitute for each row start a sequence of three codes (RG; LF; US), (B) the identification circuit is able:
to recognise sequences

| (RC; LF; US) | (RC; X; X) |
| (X; LF; US) | (X; LF; X) |
| (RC; X; US) | (Z; LF; US) |
| (RC; LF; X) | (RC; Z; US) |
| (X; X; US) | (RC; LF; Z) | and to restore in the ten cases the conventional start of row code,
to recognise whether there is an error in sequences incorporating (X; X; X) or "X and Z".

Finally, the redundancy can be introduced and exploited for the benefit of character visual display attributes, which are conventionally references by an escape code ESC followed by a second code specifying the attribute (in accordance with ISO standard 2022).

To protect these sequences and respecting International Standards, the only solution is to repeat them.

It is then possible to systematically duplicate the size change sequences, as well as the incrustation and masking sequences.

Under these conditions it is provided that:

(A) in the transmitter, the sequence formation circuit is able to constitute, for certain visual display attributes, a sequence of four codes: code ESC followed by a code notated Y, all being duplicated, i.e. (ESC; Y; ESC; Y)

(B) the identification circuit is able to:
recognise the sequences (ESC; Y; ESC; Y), (ESC; X; ESC; Y), (ESC; Y; X; Y) and (X; Y; ESC; Y) and to restore in the four cases the conventional code (ESC; Y),
to recognise that there is an error in sequences such as:

(X; X; ESC; Y)

(B) the identification circuit is able to: recognise the sequences (ESC; Y; ESC; Y), (ESC; X; ESC; Y), (ESC; Y; X; YO and (X; Y; ESC; Y) and to restore in the four cases the conventional code (ESC; Y) recognise that there is an error in sequences such as:

(X; X; ESC; Y)

(ESC; X; X; Y)

(X; Y; X; Y)

(Z; Y; ESC; Y)

(ESC; Z; ESC; Y)

(ESC; Y; Z; Y).

(C) for non-duplicated sequences (ESC; Y) the identification circuit is able to recognise (X; Y) sequences in which X differs from ESC by a single bit and indicate this error to the decoder in such a way that neither X nor Y are incorrectly considered as characters to be visually displayed.

Naturally, protection can occur simultaneously on all these codes and also on codes other than those to which reference has been made and more particularly on codes which can be visually displayed. However, in the latter case the protection rapidly leads to a considerable redundancy, which exceeds 50% in the protected zone. This type of correction is only advantageous for very special applications (e.g. for stock exchange quotations, transport timetables, etc) which must have no errors in the visually displayable codes, despite an error rate which may be high in transmission. It is known that each of these visually displayable codes to be protected is transmitted on two octets coded by Hamming, one of the octets having three information elements and the other four. Thus, according to the invention, the start of the zone is defined by a duplicated sequence such as; VT; LF; VT; LF. The end of the zone is defined by a combination of two octets using the bit left free by the visually displayable codes.

This incompatible language leads to the definition of several redundant language levels which cannot be fully exploited by the terminal except when the latter is informed of the structure of the message which it processes. This language identification is possible by means of a so-called service octet provided by the specifications and placed in front of the octets describing the page level with the page heading.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 2:
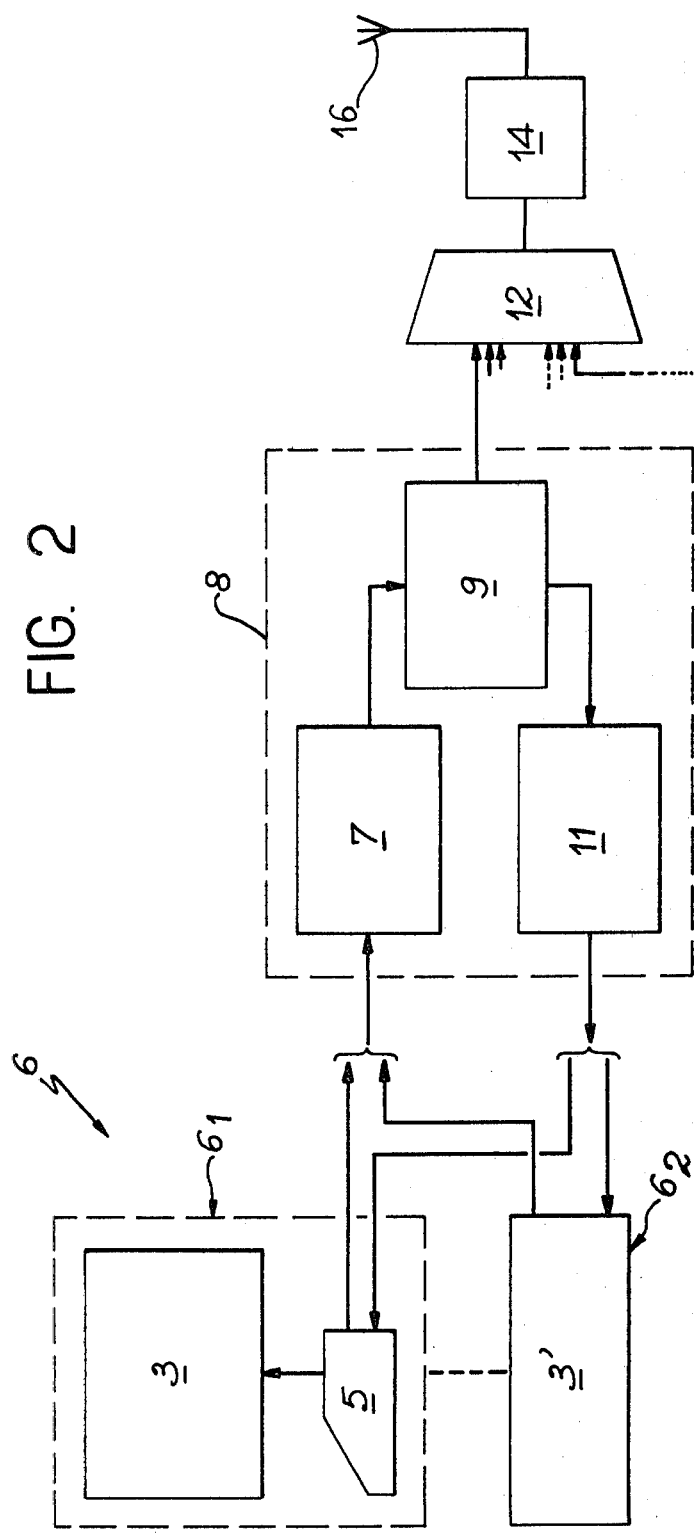
FIG. 2: the block diagram of the transmission equipment.
Figure 3:
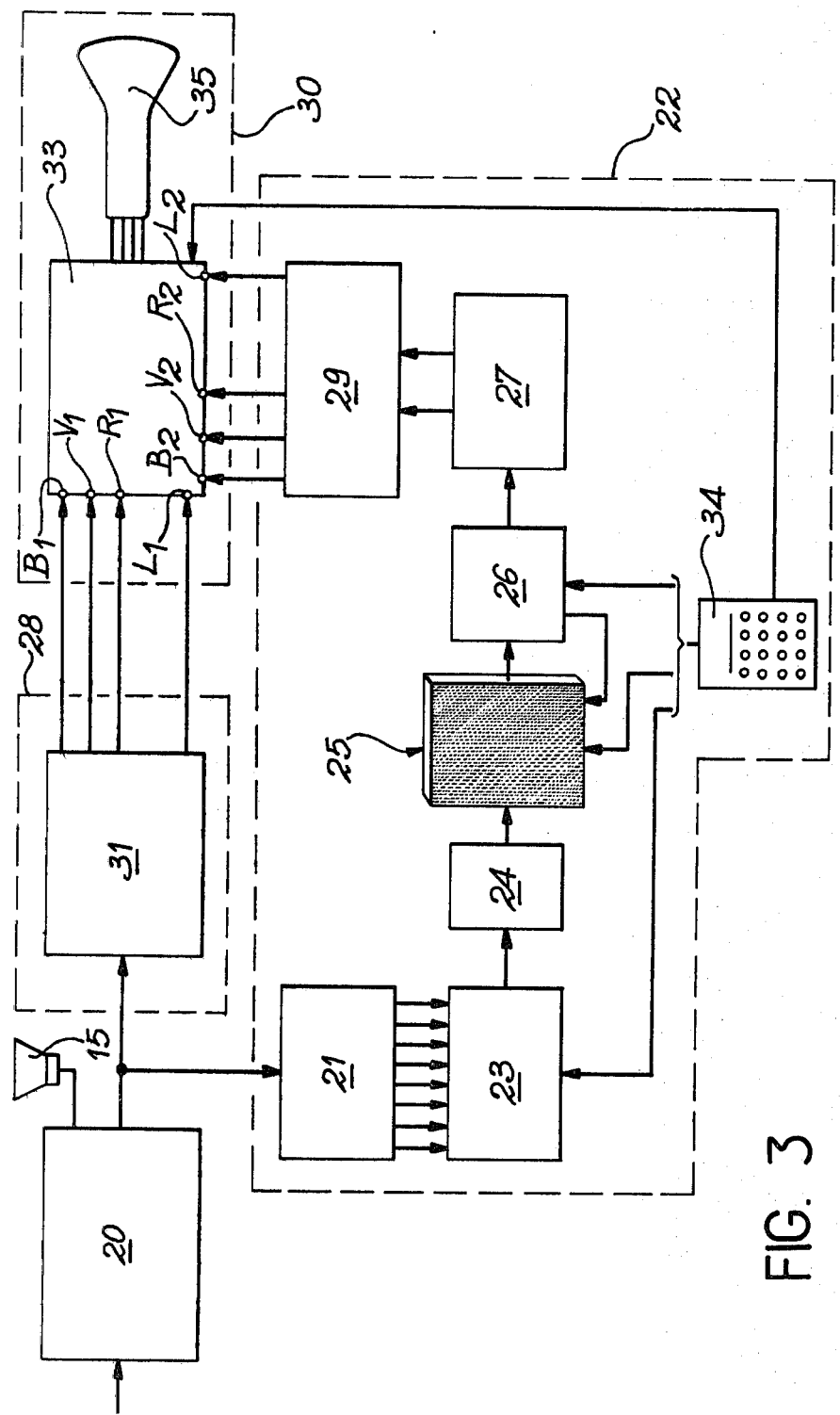
FIG. 3: a block diagram of a receiver equipped with an identification circuit according to the invention.

FIGS. 2 and 3 make it possible to place the means according to the invention in the overall videotex system, firstly in the transmission equipment (FIG. 2) and then in the receiver (FIG. 3).

Figure 1:
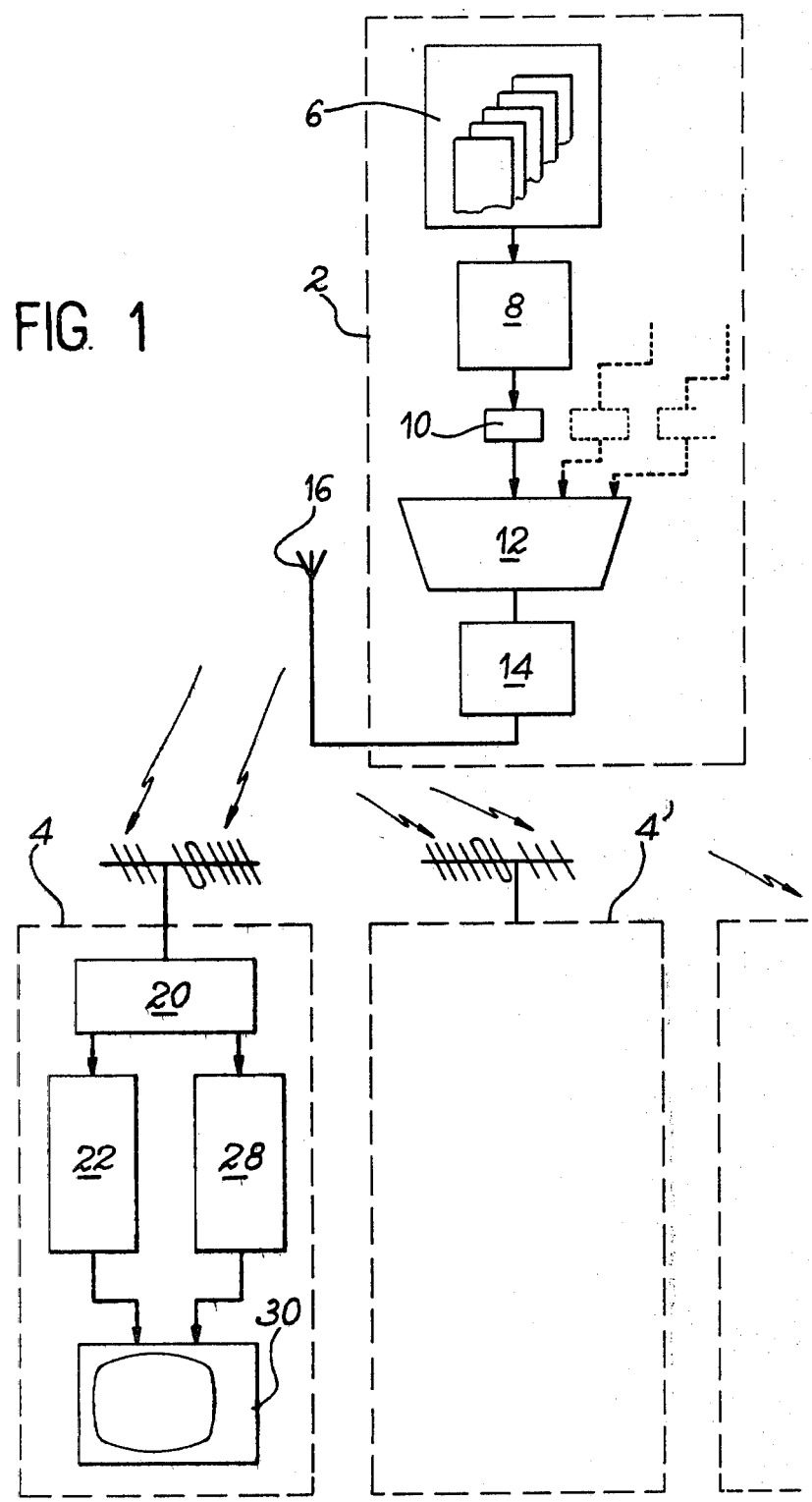
FIG. 1, already described, a block diagram of a videotex system.

The system shown in FIG. 2 is identical to that of FIG. 1 of French Patent Application No. 75 18319 referred to hereinbefore. Upstream of a modulation member 14 and a transmitting antenna 16 it is possible to switch by means of a multiplexer 12 a certain number of sources incorporating a data processing circuit 8 connected to control station 6.1, 6.2, etc. The data processing circuit 8 comprises a bringing into format circuit 7, a store 9, whose input is connected to the output of circuit 7, whereof one transmitting output can be selectively connected to the modulation member 14 and whose control output is connected to the input of a translating circuit 11. Each control station 6.1, 6.2, etc has a control screen 3 and a composition or setting keyboard 5. Each keyboard has a data output connected to the input of circuit 7 and a data input connected to the output of circuit 11.

Each station 6.1, 6.2, etc enables a journalist or operator to compose pages by means of keyboard 5 whilst checking on the control screen 3 all the characteristics of the final picture in colour: size of the characters, blinking effects and special graphical features. Each keyboard 5 is of the typewriter type and contains logic elements for the setting and updating of documents. The data supplied by station 6.1, 6.2, etc are brought into format in circuit 7 and then stored in store 9. Store 9 can be a disk store in which are stored the transmittable code sequences corresponding to the language referred to hereinbefore. Store 9 constitutes a file of the pages which are periodically read and transmitted to the modulation member 14 for transmission. An operator of a station 6.1, 6.2, etc can also make a page appear on control screen 3 by means of circuit 11.

Constructional embodiments of the equipment of FIG. 2 are known. They can be in cabled logic form or in programmed form managed by a microprocessor.

As described in French Patent Application No. 75 18319, the transmission of data is performed in the television channel in lines allocated to the DIDON system. Said data are then regrouped in packets having up to 32 octets. With each packet is linked a tag forming a prefix and giving the address of the sender and the number of octets contained in the packet. If the data flow contains more 32 octets to be transmitted, it is divided up between several packets and the tag also has the packet number. To the tag are added two octets for synchronizing the local oscillator of the receiver terminal and an octet for synchronizing the packet octets. Thus, in all, a transmitted packet comprises 40 octets, whereof the 320 bits represent black when their binary value is 0 and white when it is 1. Interference to said digital signals by the actual videosignal is minimised by selecting a repetition frequency which is an uneven multiple of the line frequency. There are 397 cycles in a line, so that the frequency of the bits is 6.20 MHz, modulation being of the non-return to zero type.

As will be seen hereinafter, the structure of the packets is not repetitive, so that data are transmitted in an asynchronous manner. The page data then systematically appear in different positions during successive transmissions, which is important for the correction procedure of possible errors.

As described in the aforementioned patent application, an electronic management unit knows the list of free lines in the picture signal and inserts into it the packets of data which it receives from the various data sources, such as the editor described in FIG. 2. The connections between the modulation member 14 and the various stores 9 have a junction which is preferably of the type described in French Patent Application No. 74 13136 filed on Apr. 16th 1974 and entitled "Standardized communications interface device". This junction makes it possible to slow down the flow rate from a source constituted by a store, when the transmission network is congested. When a transmission network is used, it is not possible to make the flow rate of the source dependent on the acceptance capacity of the receiver. In order to obviate this inadequacy, the managing computer is provided with a fictitious receiver identical to the slower receiver. If other transmission supports are used, the aforementioned junction ensures the functions indispensible for the correct transmission of signals.

The means making it possible to put the present invention into effect are located in the bringing into format circuits 7, whose structure is the same as that of circuits already used, with the difference that the present circuit forms redundant sequences of codes defined hereinbefore. Circuit 7 is not described in detail here and reference can be made to the aforementioned patent applications in connection therewith.

However, special means must be inserted in the reception terminal in order to exploit the redundancy of the transmitted signal. The following description consequently essentially relates to the structure and operation of said means.

FIG. 3 firstly makes it possible to define the position occupied by these means in a receiver station, whilst FIGS. 4 to 11 define their structure or construction.

FIG. 3 corresponds to FIG. 2 of French Patent Application No. 76 27212 filed on Sept. 6th 1976. It shows a receiver having the large functional blocks referred to in connection with FIG. 1, namely a reception and demodulation circuit 20, a picture signal processing channel 28, a digital signal processing channel 22 and a visual display means 30. Circuit 20 supplies on the one hand sound to a loudspeaker 15 and on the other the videosignal to a colour decoder and sweep generator 31. The colour signals $B_1$, $V_1$ and $R_1$ and the luminance signal $L_1$ from circuit 31 are transmitted to tube 35 across a video switch 33.

In the digital signal processing channel, the receiver station incorporates a video data separator 21 operating according to the DIDON process and which extracts sequences of octets from the analog signal. The input of the separator is connected to the video output of circuit 20 and its output is connected to a first selection circuit 23, which also operates in accordance with the DIDON process so as to extract the octets conveyed in the digital channel. The latter circuit is similar to the terminal equipment described in French Patent Application No. 75 18319. The output of circuit 23 is connected by a junction 24 of the type described in French Patent Application No. 74 13136 filed on Apr. 16th 1974 to a page selector circuit and data decoder 26, whereof the output is connected to the input of a page store 27 (the function of circuit 25 will not be described here). A subscriber keyboard 34 is connected to the control inputs of units 23 and 26 and to switch 33. The output of store 27 is connected to the input of a character generator 29. The outputs of generator 29 are connected to the colour inputs $R_2$, $V_2$ and $B_2$ of video switch 33, as well as to a luminance input $L_2$.

As the operation of this circuit has already been described in French Patent Application No. 76 27212 it will not be described again here. It is merely pointed out that at the output of the analog DIDON circuit 21 the data are octets in the form of packets enveloped by an eight octet heading procedure, including free channel number octets. The digital DIDON circuit 23 selects a digital channel, i.e. permits the passage of the useful data of the selected packets on the basis of their channel number.

Junction 24 does not have an important function in the system according to the invention, but is in particular useful for facilitating the physical separation at the transport level (DIDON) and at the service level (ANTIOPE).

The page selection and the decoding of the selected pages are carried out in circuit 26. This system decodes an information page row by row and fills the page store 27. This store can have a capacity of 1001, 16 bit words (25 rows of 40 characters, plus one control word), each character being coded on 16 bits in form and visual display attributes.

The description will now be given of the modifications to be made to this receiver in order to be able to utilise the redundancy introduced in the transmission in control code sequences. These modifications consist of introducing an identification circuit, 25 in FIG. 3, between junction 24 and decoder 26. In the case of receiver stations not having said identification circuits, junction 24 is directly connected to decoder 26 and the redundancy is not then utilised.

Figure 4:
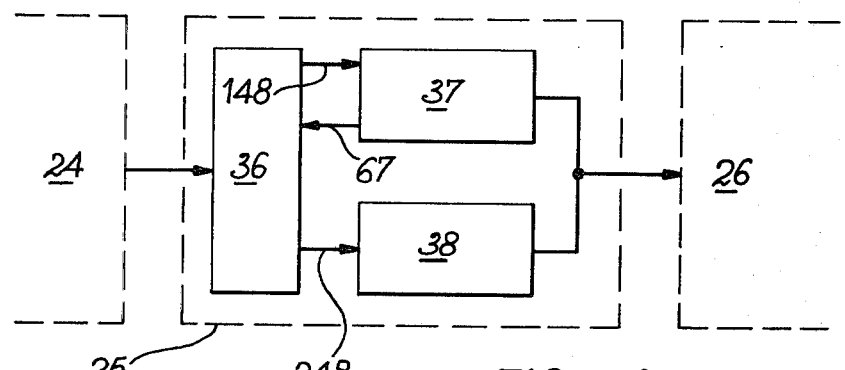
FIG. 4: a block diagram of an identification circuit.

The following drawings define the construction and operation of the identification circuit 25. As shown in FIG. 4, the identification circuit comprises:

(a) a page selection automaton 36 with one input which receives the digital signals from the digital junction 24 and two outputs 148, 248. The function of this automaton is to recognise the page heading codes and the page numbers and to pass the digital signals firstly to output 148 during the first acquisition of a page and then to output 248 during the subsequent acquisition, (b) a first acquisition automaton 37 having an input connected to output 148 of the page selection automaton and an output connected to the digital decoder 26. The function of this automaton is on the one hand to carry out corrections on erroneous codes and indicate the uncorrected erroneous codes and on the other to recognise the codes other than the page heading codes and in particular the end of page codes and transmit an end of page signal to an auxiliary output 67, (c) a subsequent acquisition automaton 38 having an input connected to the output 248 of the page selection automaton and an input connected to the digital decoder 26. The function of this automaton is to progressively eliminate errors left in the page after the first acquisition by blocking any information transfer in the case of an error between a detected error and the end of row sequence or the end of the following page sequence.

In the row where the errors are caused by echos and where a code appears in the same position during two successive transmission, the study of correlations shows that the errors are systematic and that there is no chance of correcting the page. By utilizing the asynchronous nature of the transmission in the ANTOPE system it is advantageous for the structures of the packets not to be repetitive. Thus, the probability that the same code is erroneous during a second acquisition is greatly reduced making it possible to progressively clean the page of errors which it contains.

These three circuits forming the identification circuit 25 will now be described in detail.

The selection automaton is illustrated by FIG. 3 and the circuit shown in constituted by:

three registers 175, 176, 177 able to load three numbers defining a page number, said number being supplied by decoder 26, a shift register with five cells 170, 171, 172, 173 and 174, the first cell receiving the signal supplied by junction 24, two comparators 183, 184 connected to the two last cells 173, 174 of the shift register and able to compare the content of the latter with page starting codes RS and SOH, said two comparators being associated with two parity detectors 191, 192, 3 AND gates 193, 194 and 195 having two inputs connected respectively to the outputs of comparators 183, 184 and to the outputs of parity detectors 191, 192, an OR gate 198 with three inputs connected to the outputs of the AND gates 193, 194 and 195, said gate validating three comparators 178, 179 and 180 connected on the one hand to the first three cells 170, 171, 172 via three Hamming code correctors-detectors 188, 189 and 190 and on the other hand to the three registers 175, 176, 177, a switch 181 connected to the output of the shift register and controlled by three comparators 178, 179, 180, said switch having two outputs 148 and 248, a flip-flop 182 having an output connected to switch 181 and a first input connected to the output 67 of the first acquisition automaton 67 and a second input connected to the keyboard 34.

The page selection automaton functions as follows. Shift registers 170 to 174 receive the data from digital junction 24. The content of 173 is permanently compared with the RS word by comparator 183, whilst 184 permanently compares the content of 174 with the SOH word. As soon as one or other of the combinations (X; RS), (SOH; X) or (SOH; RS) appears, gate 187 validates comparators 178 to 180. The latter compare with numbers contained in registers 175 to 177 the content of registers 170 to 172 corrected by the Hamming code correctors-detectors 188 to 190. If the comparison is positive, switch 181 is validated. This switch is controlled by flip-flop 182. The flip-flop is zeroed by a signal from a keyboard 34 and load register 175 to 177 or indicate that the page has been updated. This flip-flop is set to 1 by a signal carried by connection 67 coming from 37 indicating the end of the first acquisition. When flip-flop 182 is at zero, circuit 182 passes the output signal to connection 148. When flip-flop 182 passes to 1, the output signal is passed to connection 248.

Figure 6:
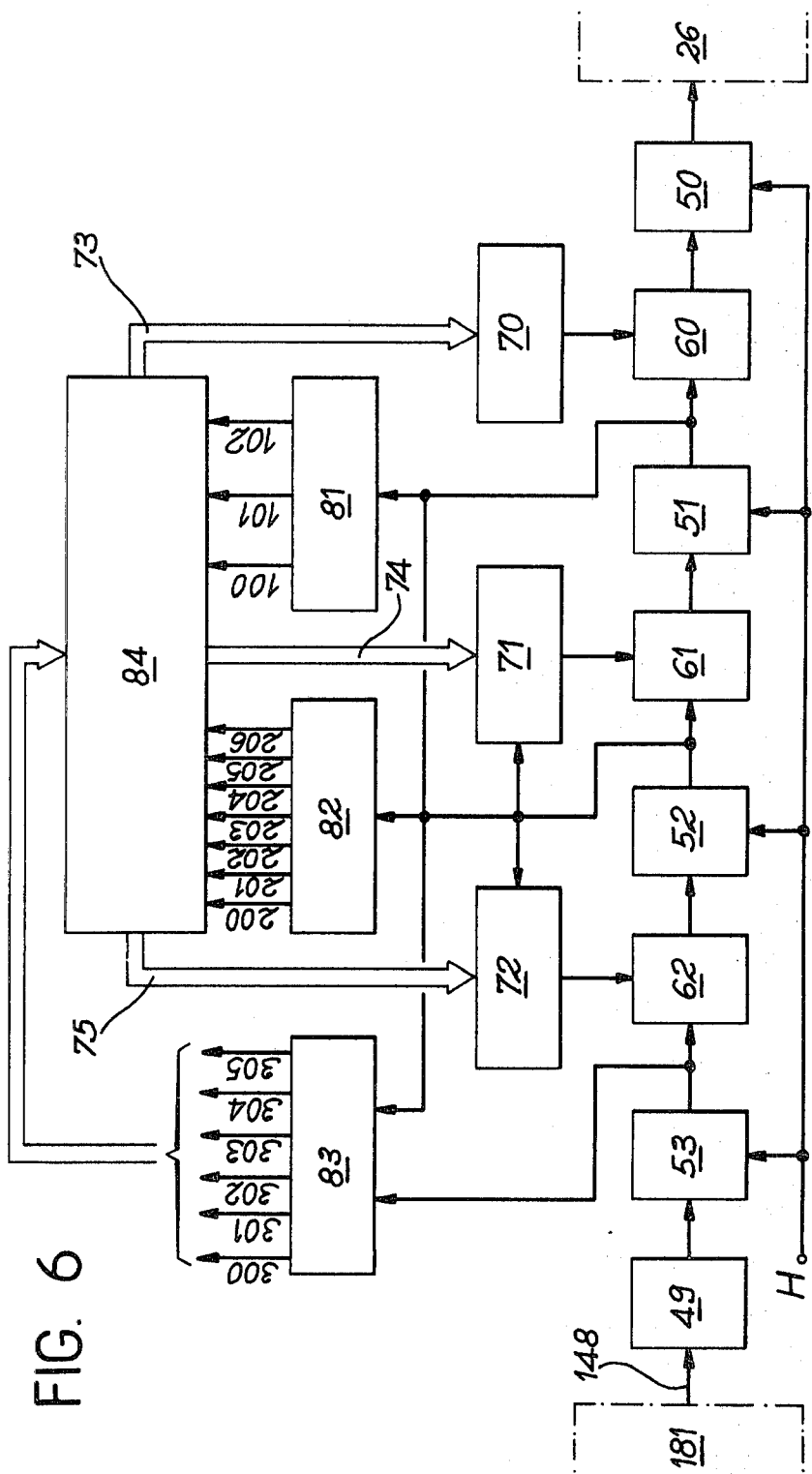
FIG. 6: a block diagram of a first acquisition automaton.

The second circuit constituting the identification circuit is the first acquisition automaton. It is shown in FIG. 6 and is constituted by:

A parity detector 49, whose input is connected to the output 148 of switch 181 of the page selection automaton.

A shift register connected to the parity detector 49 and which is formed by four memory cells 50, 51, 52, 53, the timing pulses controlling said register coming from junction 24.

A switching member constituted by three switches 60, 61, 62 having one output and two inputs, one of the said inputs being connected to the preceding store and the output is connected to the following store.

Three comparators 81, 82, 83 containing the codes in force in all the control sequences, i.e. respectively RC codes for 81, ETX, LF, ESC codes for 82 and EOT, US, ETX, ESC, RC, SS2 codes (of hexadecimal value IC) for 83, said comparators having their inputs respectively connected to the output of stores 51, 52 and 53.

A logic decision circuit 84 connected to said comparators 81, 82, 83 and supplying control signals 73, 74, 75.

Three load modules 70, 71, 72 controlled by signals 73, 74, 75.

Figure 7:
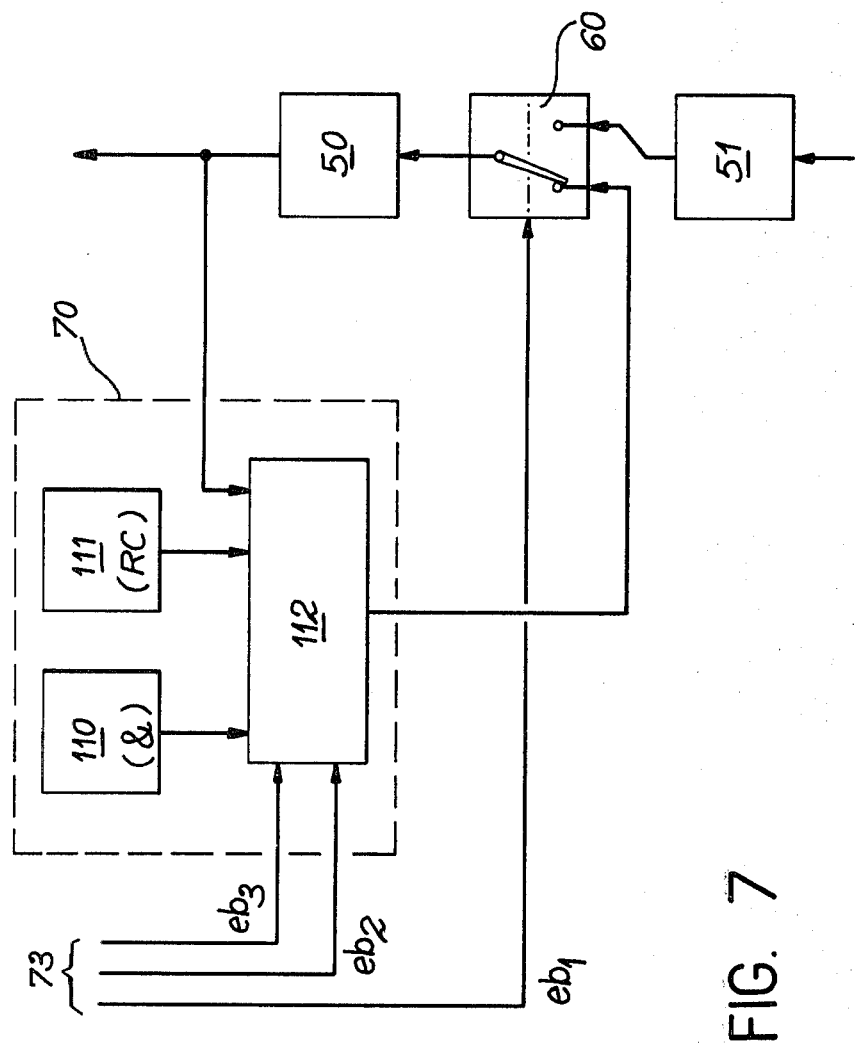
FIG. 7: a block diagram of a first load module.
Figure 8:
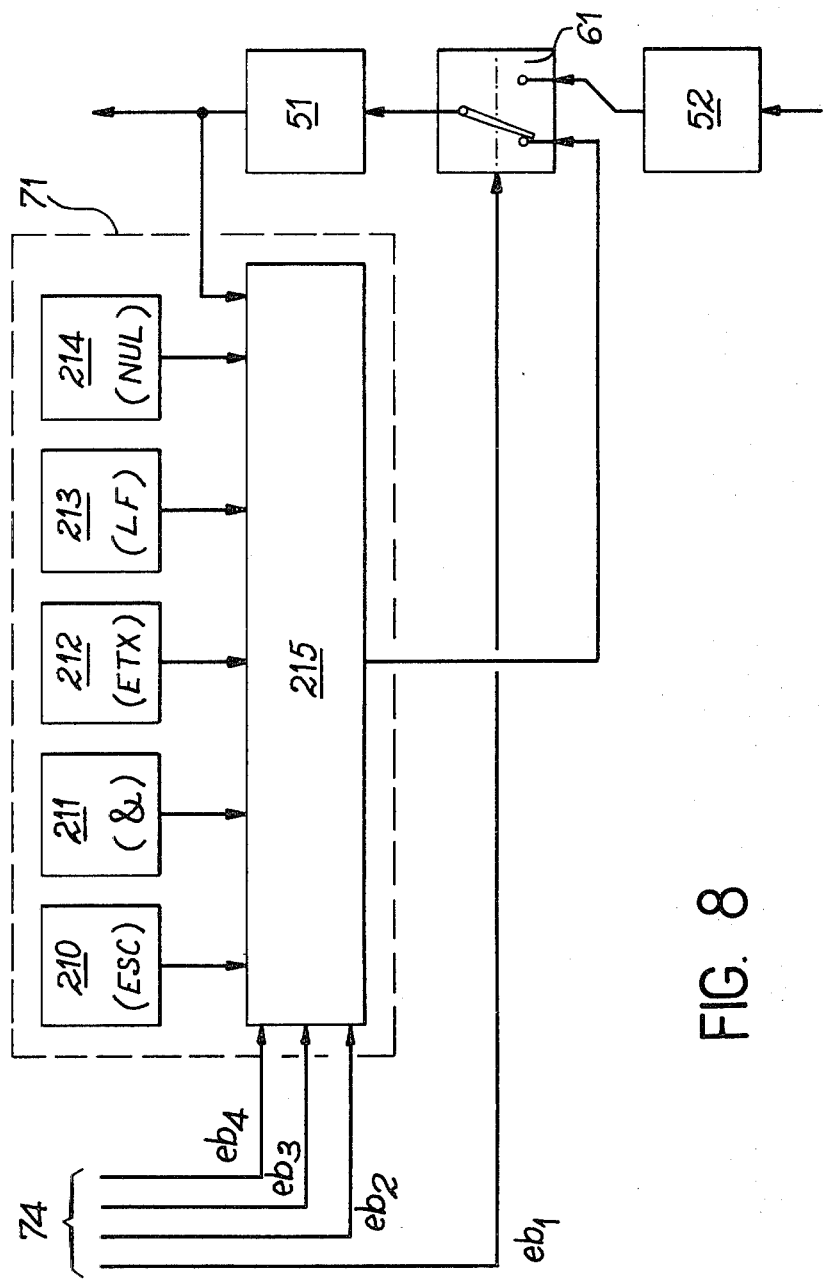
FIG. 8: a block diagram of a second load module.
Figure 9:
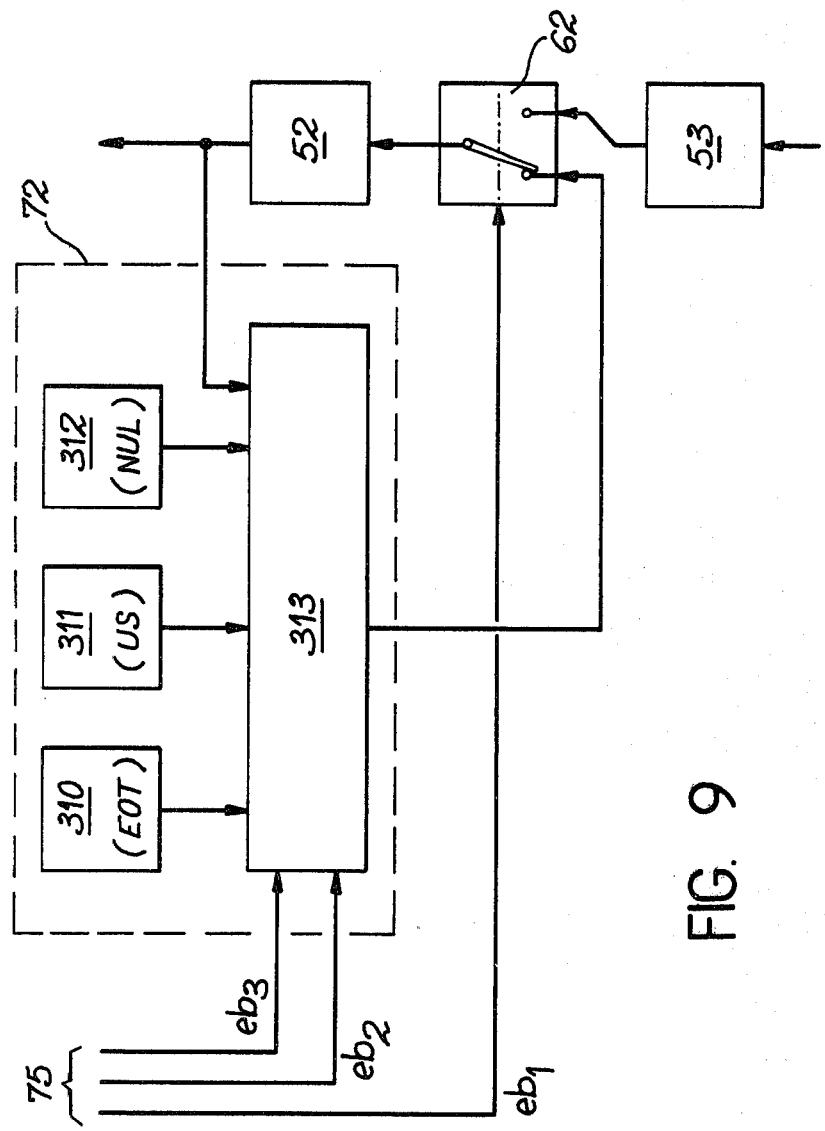
FIG. 9: a block diagram of a third load module.

The three load modules 70, 71, 72 are shown in detailed manner in FIGS. 7, 8 and 9 with their connections to the switches 60, 61 and 62 and with their control signals 73, 74, 75.

The load module 70 illustrated in FIG. 7 comprises a store 110 containing an error code &, a store 111 containing the RC code and a multiplexer 112 with three inputs connected to stores 110 and 111 and to store 50. This multiplexer is controlled by the two heavy weight bits $eb_2$ and $eb_3$ of signal 73, whilst the first bit of said signal, i.e. $eb_1$ controls the state of switch 60. One of the inputs of the latter is connected to the output of multiplexer 112, whilst the other is connected to the output of store 51.

The load module 71 shown in FIG. 8 comprises a store 210 containing the ESC code, a store 211 containing ETX code, a store 213 containing the LF code, a store 214 containing the NUL code and a multiplexer 215 having six inputs connected to stores 210 to 214 and to store 51. This multiplexer is controlled by the three high weight bits $eb_2$, $eb_3$ and $eb_4$ of signal 74, the first bit of said signal, i.e. $eb_1$ controlling the state of switch 61. One of the inputs of the latter is connected to the output of multiplexer 215 and the other to the output of store 52.

Finally, the load module 72 shown in FIG. 9 comprises a store 310 containing the EOT code, a store 311 containing the US code, a store 312 containing a jamming code, e.g. the NUL code and a multiplexer 313 with four inputs connected to stores 310 to 312 and to the store 52. This multiplexer is controlled by two high weight bits $eb_2$ and $eb_3$ of signal 75, the first bit of said signal, i.e. $eb_1$ controlling the state of switch 62. One of the inputs of the latter is connected to the output of multiplexer 313 and the other is connected to the output of store 53.

Store 312 can be replaced by a circuit cancelling out the timing pulse controlling stores 50 to 52, which has the effect of eliminating the erroneous character output in question.

The first acquisition automaton functions as follows. The signal from page selector 36 and carried by connection 148 is introduced into the parity detector 49. This detector adds a ninth validity bit to the octets which it receives and these nine bits pass through the group of stores 50 to 53 installed in the shift register, as well as the switches 60 to 62. Each switch selects, under the control of the signal associated therewith, between the content of the preceding store and the content of the load module. It then transfers the selected content to the following store. Thus, store 50 receives the content of store 51 or that of register 70, depending on the state of switch 60.

The content of stores 51 to 53 is controlled by comparators 81 to 83. The tests performed by these comparators are shown in the following table I and there are 16 of them.

The 16 results are processed in the decision logic 64, which is a combinatory logic from which the three signals 73, 74 and 75 are obtained. The first bit of each of these signals is generally at zero and in this case the switches 60, 61, 62 are in a position such that the stores 50 to 53 function as a shift register. If this is not the case, e.g. if the first bit of 75 is equal to 1 switch 62 permits the passage to 52 of the content of one of the stores contained in register 72 and addressed by the other bits of signal 65.

The decision logic 84 is a combinatory logic whereby, as a function of the 16 values of the input signals, it is merely necessary to give the corresponding output signals, which is summarized in the following table II.

It should be noted that the code US being followed by a row number on two digits, automaton 84 is blocked during two timing pulses by a counter after detection of the signal 303 and that the signals 302 or 202 bring about the transmission of the signal on connections 67 causing the zeroing of flip-flop 182 and indicating the end of acquisition of a page.

Figure 10:
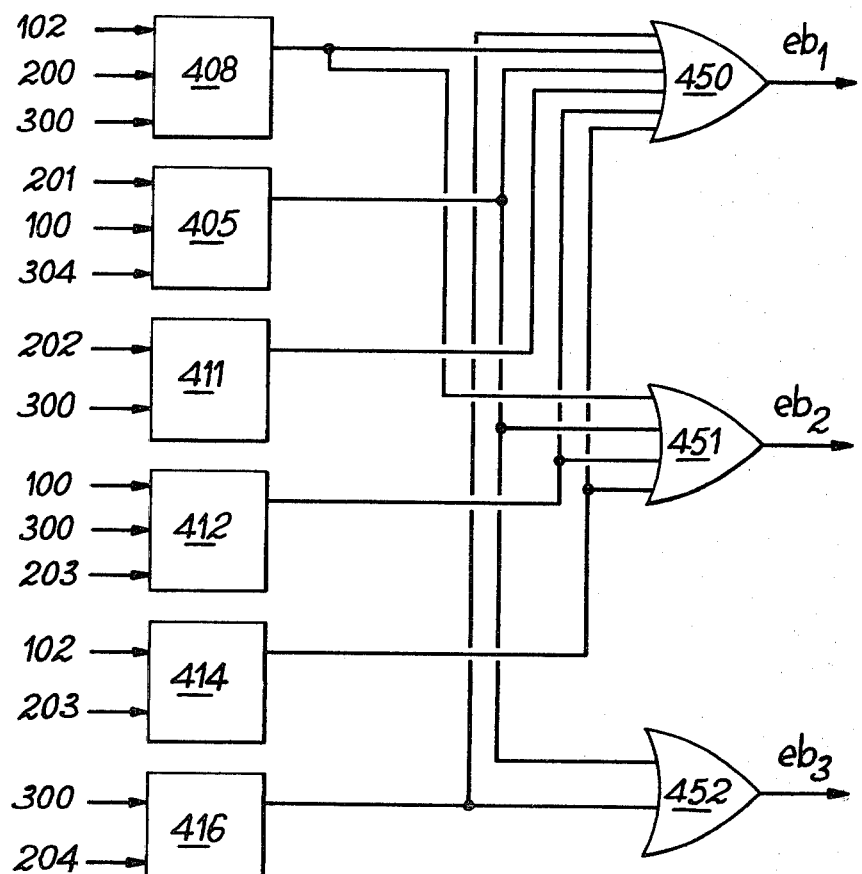
FIG. 10: a logic circuit able to produce a control signal of the third load module.
Figure 5:
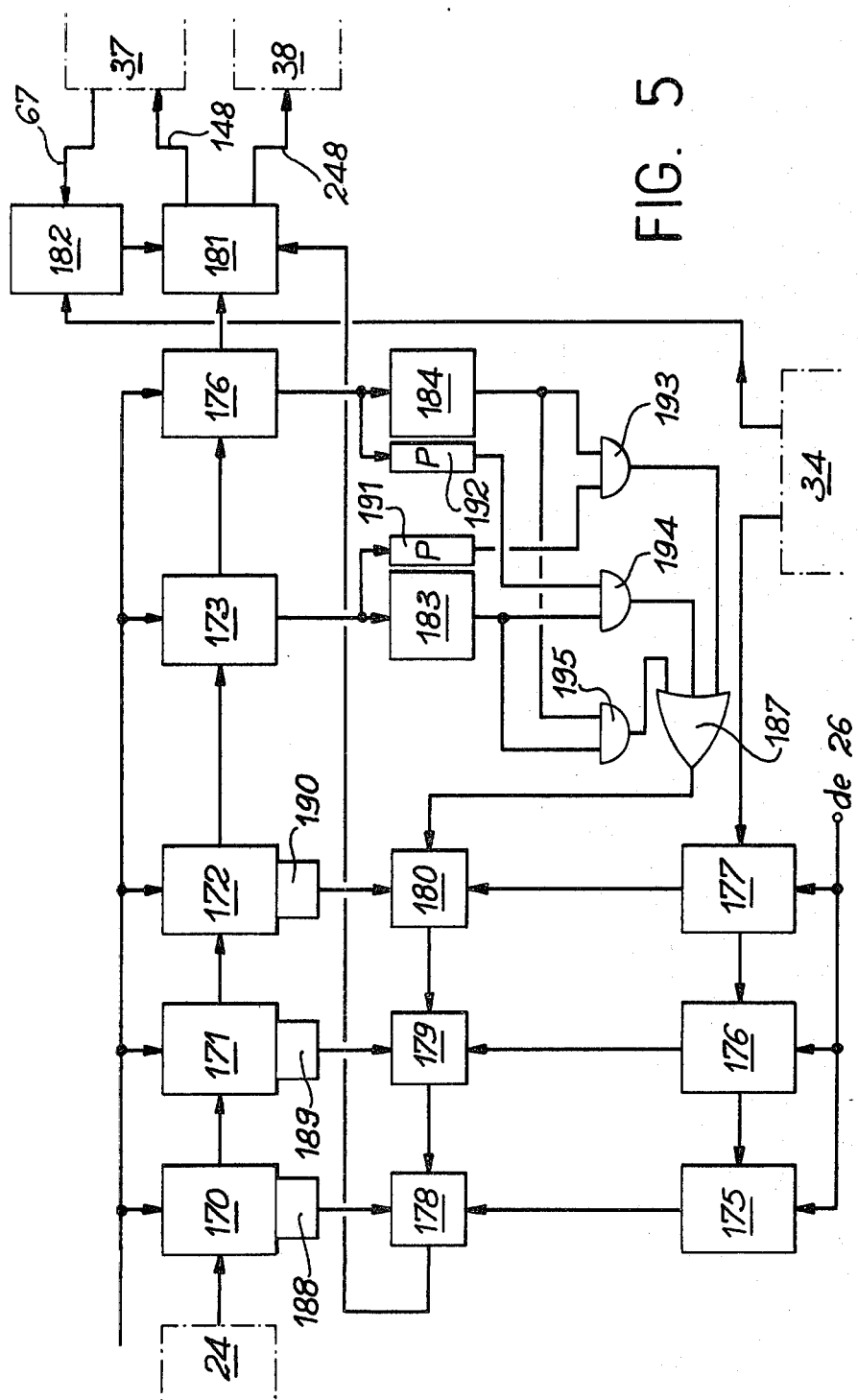
FIG. 5: a block diagram of a page selection automaton.

The diagram of FIG. 10 illustrates an exemplified logic circuit making it possible to process signal 75. It is therefore a subassembly of logic 84. The circuit shown carries out tests on the signals which it receives and supplies three bits $eb_1$, $eb_2$ and $eb_3$, the first defining the state of switch 62 and the two others the state of the multiplexer 313 of the load module 72 (of FIG. 9). The circuit of FIG. 10 comprises on the one hand logic circuit 405, 408, 411, 412, 414 and 416 carrying the corresponding logic operations indicated in Table II and on the other three logic OR gates 450, 451 and 452, the first supplying $eb_1$ and the two others $eb_2$ and $eb_3$. Table III summarises the tests performed by the subassembly of FIG. 10 and defines the values of the bits of signal 75 and the address corresponding thereto.

The circuit making it possible to process signals 73 and 74 are identical to that of FIG. 10 and will not be described.

The automaton 38 for acquisitions following the first acquisition is very similar to the first acquisition automaton 37, except that it only detects the start of row sequences RC, LF, US and blocks any transfer of information in the case of error between the detected error and the detection of an end of row or page sequence.

Figure 11:
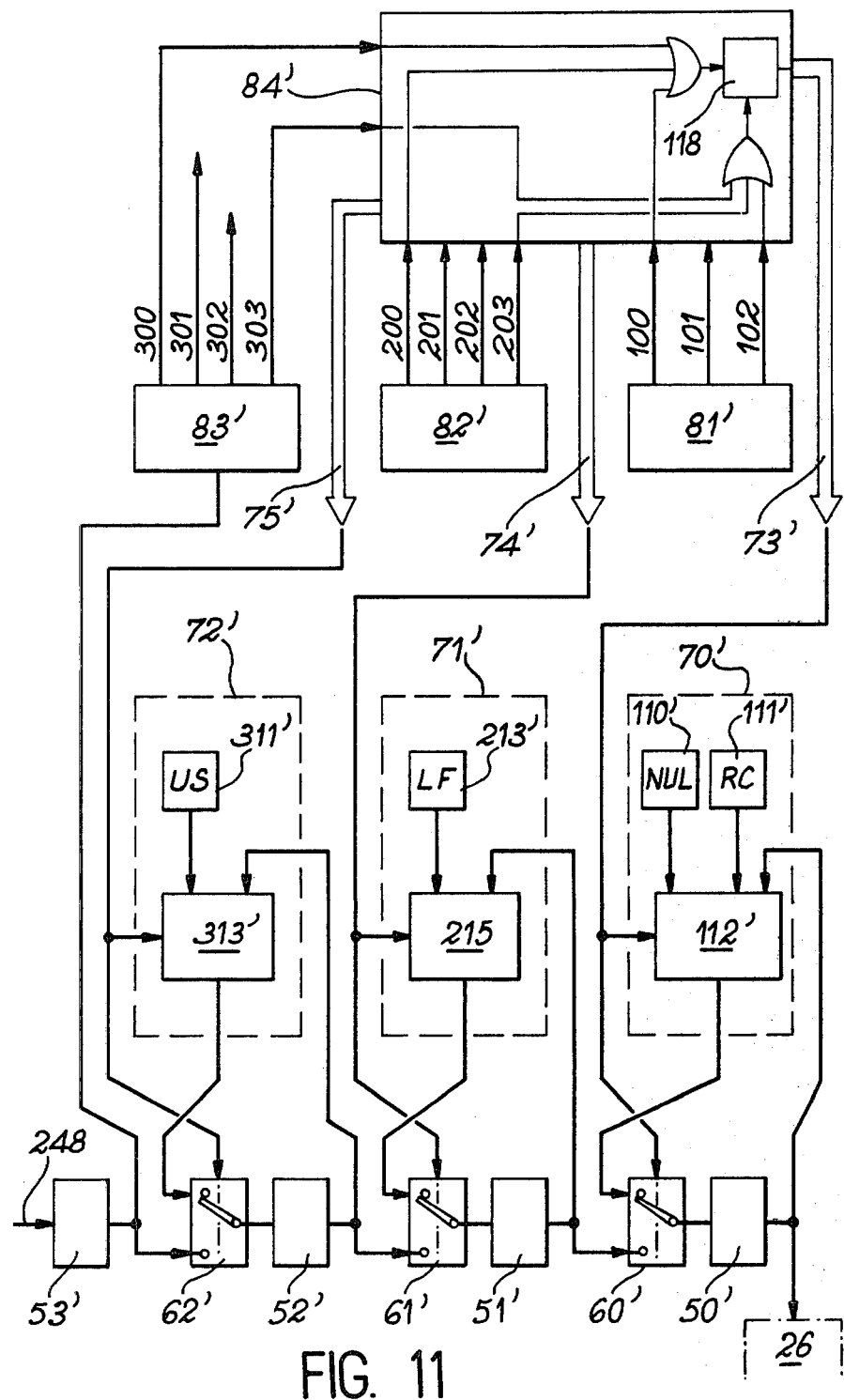
FIG. 11: a block diagram of a subsequent acquisition automaton.

The block diagram of this automaton is given in FIG. 11 where the numerical references correspond to those of FIG. 6, but are followed by an apostrophe.

In this diagram, it should be noted that the store 110' of load module 70' contains a jamming code, e.g. the NUL code in place of the visually displayable error code as in the module corresponding to the first acquisition automaton and that there is only one store 213' in module 71' and one store 311' in module 72'. As hereinbefore, jamming can be replaced by an inhibition of the output.

The test performed by the comparators of the subsequent acquisition automaton are less numerous than those of the comparators corresponding to the first acquisition automaton and appear in Table IV.

The decision logic 84' carries out tests 407, 408, 412, 413, 414 and 415 already encountered in the tests of logic 84 of the first acquisition automaton. Table V summarises the logic states corresponding to these tests, indicates which of the three signals 73', 74' and 75' are validated, gives the corresponding addresses in the load modules and defines the addressed code.

The decision logic 84' also contains a flip-flop 118 set to 1 by the results of tests 100, 200 or 300 and set to zero by 102, 203 or 303, which have a priority action. The signal from this flip-flop validates 73' with the address of 110' containing the NUL code, making it possible to cancel out all the codes between the detection of an error and the detection of a row synchronization.

Naturally, all the circuits described hereinbefore can be realised by means of a microprocessor which would accomplish the same functions and would lead to the same result, both on transmission and on reception. This mode enters within the scope of equivalences.

Moreover, they have been described in the case of codes representing control functions for the writing of alphanumeric codes. Their number can be increased and other identical circuits can be used for other graphical functions and the description provided extends to other code sequences, such as codes making it possible to pass from a "character" mode to the "vectorial" mode (also called geometrical) or "point to point" (also called facsimile, telescopic or photographic). Within these modes, the succession of codes can also be structured in such a way that the circuits described hereinbefore can be used, except that the values assigned to the comparators or to the load modules are changed and the decision logic is consequently modified. Each mode (alphabetic, geometrical, photographic) requires a complete system as described hereinbefore in which only the values are changed in the manner given in tables I to V.

TABLE I

Tests performed by the comparators of the first acquisition automaton.

| Comparator Test. No. | Operations performed |
| --- | --- |
| 100 | Invalidity bit |
| 101 | Comparison of content of 51 with that of 52, to within 1 bit |
| 102 | Comparison with RC. |
| 200 | Invalidity bit |
| 201 | Comparison with content of stores 50 or 51 |
| 202 | Comparison with ETX |
| 203 | Comparison with LF |
| 204 | Comparison with ESG |
| 205 | Comparison with ESC to within 1 bit |
| 206 | Comparison with 0 of bits 6 and 7. |
| 300 | Invalidity bit |
| 301 | Comparison with 1 of 7th bit and with 0 of 6th bit |
| 302 | Comparison with EOT |
| 303 | Comparison with US |
| 304 | Comparison with content of store 52 to within one bit. |
| 305 | Comparison with ETX or ESC or RC or SS2. |

TABLE II

Decision Logic

| Operations | Conditions and effects. |
| --- | --- |
| 401 | 200, 205, 301 equal to 1 simultaneously bring about the validation of 74 with the address of 210. |
| 402 | 200 and 301 equal to 1 and 205 equal to 0. as well as |
| 403 | 200 and 305 equal to 1 or |
| 405 | 203 equal to 1 and 100 or 300 zero or |
| 405 | 201 equal to 1, 100 zero as well as 304 validates 74 with the address of 211, the latter case also validating 75 with the address corresponding to the content of 52 |
| 406 | 200 and 302 equal to 1 validates 74 with the address of 212 |
| 407 | 102, 200 and 303 equal to 1 validates 74 with the address of 213 |
| 408 | 102, 200 and 300 equal to 1 validates 74 and 75 respectively with the address of 213 and that of 311 |
| 409 | 100, 101 and 201 equal to 1 validates 73 with the address corresponding to the content of 52 |
| 410 | 100 and 201 equal to 1 but 101 zero validates 71 with the address of 110 |
| 411 | 202 and 300 equal to 1 validates 75 with the |

TABLE II-continued

| Operations | Decision Logic Conditions and effects. |
|---|---|
| | address of 310 |
| 412 | 100, 300 and 203 validates 73 and 75 respectively with the addresses of 101 and 311 |
| 413 | whilst 303, 203 are equal to 1 with 100 zero validates 73 with the address of 111 |
| 414 | 103 and 203 equal to 1 validates 75 with the address of 311 |
| 415 | 102 equal to 1, 200, 203, 303 zero validates 73 with the address of 110 |
| 416 | 300 and 204 equal to 1 validates 74 and 75 with the addresses of 214 and 312 respectively. |

TABLE III

Decision logic equals formation of signal 75 (FIG. 10)

| Test No. | Logic states of Signal 75 input signals. | $eb_2$ | $eb_3$ | Address in multiplier 313 of 72 |
|---|---|---|---|---|
| 405 | 201 = 1<br>100 = 0<br>304 = 0 | 1 | 1 | 52 |
| 408 | 102 = 1<br>200 = 1<br>300 = 1 | 1 | 0 | 311 |
| 411 | 202 = 1<br>300 = 1 | 0 | 0 | 310 |
| 412 | 100 = 1<br>300 = 1<br>203 = 1 | 1 | 0 | 311 |
| 414 | 1-2 = 1<br>203 = 1<br>300 = 1 | 1 | 0 | 311 |
| 416 | 204 = 1 | 0 | 1 | 312 |

TABLE IV

Tests performed by the subsequent acquisition automaton comparators

| Test No | Operation |
|---|---|
| 102 | Comparison of content of 51' with RC |
| 203 | Comparison of content of 52' with LF |
| 303 | Comparison of content of 53' with US |
| 100 | Invalidity bit of octet contained in 51' |
| 200 | Invalidity bit of octet contained in 52' |
| 300 | Invalidity bit of octet contained in 53'+ |

TABLE V

Decision logic of the subsequent acquisition automaton

| Tests performed | Logic states | Validation circuit | Controlled load module | Address module | Code corresponding to the address. |
|---|---|---|---|---|---|
| 407 | 102 = 1<br>200 = 1<br>303 = 1 | 74' | 71' | 213 | LF |
| 408 | 102 = 1<br>200 = 1<br>300 = 1 | 74' and 75' | 71<br>72' | 213'<br>311' | LF<br>US |
| 412 | 100 = 1<br>300 = 1<br>203 = 1 | 73<br>and 75' | 70'<br>72' | 111'<br>311' | RC<br>US |
| 413 | 303 = 1<br>203 = 1<br>100 = 0 | 73 | 70' | 111' | RC |
| 414 | 102 = 1<br>203 = 1 | | 75' | 72' | 111' | RC |
| 415 | 102 = 1<br>200 = 0<br>203 = 0 | 73' | 70' | 110' | NUL |

TABLE V-continued

Decision logic of the subsequent acquisition automaton

| Tests performed | Logic states | Validation circuit | Controlled load module | Address module | Code corresponding to the address. |
|---|---|---|---|---|---|
| | 303 = 0 | | | | |

What is claimed is:

1. A videotex system comprising a transmission station and receiver stations, whereby the transmission station comprises:

means for composing or setting a magazine constituted by pages organised in rows of characters, a data processing circuit incorporating means for coding the characters as digital signals grouped in data octets (8 bits) and means for forming control octets with 6th and 7th zero bits, constituted by codes indicating more particularly the headings and ends of pages, the headings and ends of rows, as well as visually display attributes, all the control and data octets incorporating a heavy weight bit which is an imparity bit, the circuit finally having a magazine store in the form of data octets inserted between the control octets, a junction connected to the data processing circuit a transmission multiplexer used for the insertion of data into the lines of television signals, a modulation member, each receiver station comprises:

a circuit for the reception and demodulation of the television signal, a digital signal processing channel containing a digital junction followed by a digital signal decoder, a videopicture signal processing channel a visual display member wherein (A) in the transmission station: the data processing circuit comprises control signal formation means constituted, for each control, by a redundant sequence of control codes, each sequence being formed by at least two consecutive codes, whereof at least one is the conventional code corresponding to the control in question and the other or others having no significance liable to interfere with the conventional receivers and (B) in certain of the receiver stations: an identification circuit is provided in the digital signal processing channel and between the digital junction and the decoder which utilises the redundancy of the control sequences (a) for recognising in the sequences a particular control in spite of minor errors which can occur in this sequence and to restore a corrected control code corresponding to the conventional code which is then taken into account by the decoder (b) and to recognise and indicate to the decoder that certain control code sequences are seriously erroneous and must not be taken into account, (C) the receiver stations which are not provided with an identification circuit and which process in a conventional manner the digital signals passing directly from the digital junction to the decoder.

2. A videotex system according to claim 1, wherein the identification circuit is able to:

correct the control sequences of two erroneous codes comprising an octet and a single invalid octet in the sense of parity (octet X)

correct the control sequences of three erroneous codes comprising up to two X octets without a Z octet, whereby the latter is valid in the sense of parity, but which does not belong to the sequence which is running, or a Z octet without an X octet indicate erroneous sequences comprising a number of X octets and Z octets in excess of the given value, which is dependent on the sequence length of which comprises an x octet and a Z octet.

3. A videotex system according to claim 2, wherein as a page start is referenced by the conventional page flag code designated RS:
(A) in the transmitter, the sequence formation circuit is able to constitute for each page start a sequence of two codes: the RS code preceded by a code having no significance for receiver not provided with identification circuits, e.g. the SOH code, the sequence then being written (SOH; RS);
(B) the identification circuit of receivers equipped therewith is able to:
recognize sequences such as:

(SOH; RS), (X; RS), (SOH; X)

and restore in the three cases the conventional page flag code RS to the decoder
recognise that there is an error in sequences such as:

(X; X), (Z; RS), (SOH; Z)

and indicate it to the decoder.

4. A videotex system according to claim 2, wherein as an end of page is referenced by the conventional code ETX:
(A) in the transmitter, the sequence formation circuit is able to constitute for each end of page a sequence of two codes: the ETX code followed by a code having no significance for the receivers not equipped with the identification circuit, e.g. the EOT code
(B) the identification circuit is able to:
recognize sequences such as:

(ETX; EOT), (ETX; X), (X; EOT)

and supply to the decoder in the three cases the conventional end of page code ETX
recognise that there is an error in sequences such as:

(X; X), (Z; EOT), (ETX; Z)

and to indicate it to the decoder.

5. A videotex system according to claim 2, wherein as the row synchronization is referenced either by the conventional carriage return RC followed by the line jump code LF, or then by the row flag code US followed by the row number
(A) in the transmitter, the sequence formation circuit is able to constitute for each part of a row a sequence of three codes (RC; LF; US),
(B) the identification circuit is able to:
recognise the sequences:

| | |
|---|---|
| (RC; LF; US) | (RC; X; X) |
| (X; LF; US) | (X; LF; X) |
| (RC; X; US) | (Z; LF; US) |
| (RC; LF; X) | (RC; Z; US) |
| (X; X; US) | (RC; LF; Z) | and to supply to the decoder in the ten cases the conventional start of row code
recognise that there is an error in the sequences which contain (X; X; X) or "X and Z" and indicate it to the decoder.

6. A videotex system according to claim 2, wherein as a character visual display attribute is referenced by an escape code ESC followed by a second code Y specifying the attribute
(A) in the transmitter, the sequence formation circuit is able to constitute for certain visual display attributes a sequence of four codes: code ESC followed by code Y, duplicated, namely (ESC; Y; ESC; Y)
(B) the identification circuit of the receivers equipped therewith is able to:
recognise sequences (ESC; Y; ESC; Y) (ESC; X; ESC; Y), (ESC; Y; X; Y) and (X; Y; ESC; Y)
and supply in all four cases the conventional code (ESC; Y) to the decoder
recognise that there is an error in the sequences such as:

(X; X; ESC; Y)

(ESC; X; X; Y)

(X; Y; X; Y)

(Z; Y; ESC; Y)

(ESC; Z; ESC; Y)

(ESC; Y; Z; Y)

and indicate it to the decoder
(C) for non-duplicated sequences (ESC; Y) the identification circuit is able to recognise sequences (X, Y) in which X differs from ESC by a single bit and indicate it to the decoder.

7. A videotex system according to claim 1, wherein the transmitter contains means such that the page data are systematically in different positions during successive transmissions.

8. A videotex system according to claim 1, wherein the identification circuit comprises:
(A) a page selection automaton having an input which receives the digital signals from the digital junction and two outputs, said automaton having the function of recognising the page heading codes and the page numbers and to pass the digital circuits firstly to the first output during the first acquisition of a page and then to the second output during the acquisition subsequent to the first.
(B) a first acquisition automaton having an input connected to the first output of the page selection automaton and an output connected to the digital decoder, said automaton having the function of on the one hand recognising codes other than the page heading code and to detect more particularly the end of page code and transmit by an auxiliary output and end of page signal and on the other hand to carry out corrections on the erroneous codes and indicate the uncorrected erroneous codes, (C) a subsequent acquisition automaton having an input connected to the second output of the page selection automaton and an output connected to the digital decoder, said automaton having the function of progressively eliminating errors remaining in the page following the first acquisition by blocking any information transfer in the case of an error between a detected error and the following sequence of end of row and end of page codes.

9. A videotex system according to claim 8, wherein the page selection automaton is constituted by:
three loading registers of three numbers defining a page number,
a shift register with five cells,
two comparators connected to the two last cells of the shift register and able to compare the content of the latter with the start of page codes RS and SOH,
two parity detectors,
three AND gates with two inputs connected to the comparators and to the parity detectors,
an OR gate with three inputs connected to the outputs of the AND gates, said gate validating three comparators connected on the one hand to the three first cells of the shift register and on the other to the three loading registers,
a switch connected to the output of the shift register and controlled by three comparators, said switch having two outputs,
a flip-flop connected to the switch.

10. A videotex system according to claim 8, wherein the first acquisition automaton comprises:
a parity detector whose input is connected to the output of the switch of the page selection automaton,
a shift register having a plurality of stores connected to the parity detector,
three switches inserted between the stores, said switches having an output connected to the following store and two inputs, whereof one is connected to the preceding store,
three comparators containing the codes in force in all the control sequences, the inputs of these comparators being connected to the output of the stores and carrying out comparisons between the codes received and the codes in force,
a logic decision circuit connected to the comparators and supplying, as a function of the results of the comparisons, control signals,
three load modules containing the control codes and an error code, said modules being controlled respectively by said control signals, the switches sampling either the code stored in the preceding store if the latter are identical to the codes in force, or the codes recorded in the load modules with which they are linked if the codes received suffer from minor errors, or an error code sampled from the load module if the codes received have major errors.

11. A videotex system according to claim 8, wherein the second acquisition automaton is of the same type as the first acquisition automaton according to claim 9, with the exception that in place of a visually displayable error signal a jamming code, for example the NUL code is stored in the load module where the latter inhibits the corresponding erroneous character output.

12. A videotex system according to claim 1, wherein:
(A) in the transmitter there is a microprocessor carrying out the composition of the redundancy sequences of control codes,
(B) in certain receivers there is a microprocessor for carrying out the operations of recognizing the codes and correcting erroneous codes.

* * * * *